United States Patent
Chakraborty et al.

(10) Patent No.: US 10,831,927 B2
(45) Date of Patent: Nov. 10, 2020

(54) NOISE PROPAGATION-BASED DATA ANONYMIZATION

(71) Applicant: International Business Machines Corporation, Armonk, NY (US)

(72) Inventors: Supriyo Chakraborty, White Plains, NY (US); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 15/820,790

(22) Filed: Nov. 22, 2017

(65) Prior Publication Data

US 2019/0156061 A1    May 23, 2019

(51) Int. Cl.
*H04L 29/06* (2006.01)
*G06F 21/00* (2013.01)
*G06F 21/62* (2013.01)

(52) U.S. Cl.
CPC ...... *G06F 21/6254* (2013.01); *G06F 21/6227* (2013.01); *H04L 63/0421* (2013.01)

(58) Field of Classification Search
CPC ............. G06F 21/6254; G06F 21/6227; G06F 16/258; H04L 63/0421
See application file for complete search history.

(56) References Cited

U.S. PATENT DOCUMENTS

| | | |
|---|---|---|
| 8,244,689 B2 | 8/2012 | Betz et al. |
| 8,627,483 B2 | 1/2014 | Rachlin et al. |
| 9,569,696 B1* | 2/2017 | Osindero ........... G06K 9/00711 |
| 10,169,468 B2* | 1/2019 | Cho ................... G01C 21/3679 |
| 2013/0291128 A1* | 10/2013 | Ito ....................... G06F 21/6254 726/30 |
| 2013/0339359 A1* | 12/2013 | Goyal .................. G06F 16/258 707/737 |
| 2014/0214778 A1 | 7/2014 | Betz |
| 2017/0039174 A1 | 2/2017 | Strope et al. |
| 2017/0085929 A1 | 3/2017 | Arpteg |
| 2017/0124336 A1* | 5/2017 | Freudiger ............... G06F 16/22 |
| 2017/0316071 A1* | 11/2017 | Hao ....................... G06F 16/248 |
| 2018/0131740 A1* | 5/2018 | Ramamurthy ....... H04L 65/4069 |
| 2019/0139092 A1* | 5/2019 | Nomula ............. G06Q 30/0277 |

FOREIGN PATENT DOCUMENTS

| | | |
|---|---|---|
| JP | 2016009196 A | 1/2016 |
| JP | 2016081168 A | 5/2016 |

OTHER PUBLICATIONS

International Search Report and Written Opinion, dated Feb. 12, 2019, International App. No. PCT/IB2018/058803, 9 pages.

(Continued)

*Primary Examiner* — Lisa C Lewis

(74) *Attorney, Agent, or Firm* — Scott S. Dobson

(57) ABSTRACT

A first set of data associated with one or more data stores is received. A distance from a representation of a subset of the first set of data to at least a second representation of another set of data in vector space is identified. In response to the identifying of the distance, the first set of data is anonymized. The anonymizing includes adding noise to at least some of the first set of data.

9 Claims, 13 Drawing Sheets

(56) References Cited

OTHER PUBLICATIONS

"Autoencoders," Unsupervised Feature Learning and Deep Learning Tutorial, printed: May 15, 2017, pp. 1-6. http://ufldl.stanford.edu/tutorial/unsupervised/Autoencoders/.

Jurczyk et al., "Privacy-Preserving Data Publishing for Horizontally Partitioned Databases," CIKM '08: Proceedings of the 17th ACM Conference on Information and Knowledge Management, Oct. 26-30, 2008, 2 pages, ACM.

Li et al., "t-Closeness: Privacy Beyond k-Anonymity and t-Diversity," ICDE 2007, IEEE 23rd International Conference on Data Engineering, 2007, 10 pages, IEEE. https://www.cs.purdue.edu/homes/ninghui/papers/t_closeness_icde07.pdf.

Machanavajjhala et al., "t-Diversity: Privacy Beyond k-Anonymity," ACM Transactions on Knowledge Discovery from Data (TKDD), Mar. 2007, pp. 1-12, ACM. http://www.cs.jhu.edu/~sdoshi/jhuisi650/papers/ldiversity.pdf.

Nasr, K., "Deep Autoencoders," GSoC 2014 project, printed May 15, 2017, pp. 1-7. http://www.shogun-toolbox.org/static/notebook/current/autoencoders.html.

Rong, X., "word2vec Parameter Learning Explained," arXiv:1411.2738v4, Jun. 5, 2016, pp. 1-21. https://arxiv.org/abs/1411.2738v4.

Socher et al., "Reasoning With Neural Tensor Networks for Knowledge Base Completion," Advances in Neural Information Processing Systems 26 (NIPS 2013), Proceedings from the conference: Neural Information Processing Systems 2013, pp. 1-10. https://nlp.stanford.edu/pubs/SocherChenManningNg_NIPS2013.pdf.

Sweeney, L., "k-Anonymity: A Model for Protecting Privacy1," International Journal on Uncertainty, Fuzziness and Knowledge-based Systems, 10 (5), 2002; 557-570, pp. 1-14. https://epic.org/privacy/reidentification/Sweeney_Article.pdf.

"Vector Representations of Words," TensorFlow Tutorials, printed May 15, 2017 (last updated Apr. 26, 2017), pp. 1-8. https://www.tensorflow.org/tutorials/word2vec.

Mell et al., "The NIST Definition of Cloud Computing: Recommendations of the National Institute of Standards and echnology," Special Publication 800-145, Sep. 2011, 7 pages, National Institute of Standards and Technology, Gaithersburg, MD.

\* cited by examiner

US 10,831,927 B2

NOISE PROPAGATION-BASED DATA ANONYMIZATION

BACKGROUND

This disclosure relates generally to data anonymization, and more specifically to anonymizing data based on noise propagation.

Data anonymization refers to computing mechanisms that are used to remove and/or obfuscate one or more attribute values of one or more data stores such that the resulting views of the data store can no longer be used to identify a name of an individual or associate an individual to sensitive information. The goal is to balance the need to publish reliable data about individuals without linking sensitive information about them to their identities such that others may not be able to infer that a particular individual is associated with a particular set of data (e.g., a disease type, a salary figure, etc.).

Agencies and other organizations often need to publish microdata (e.g., medical data or census data) for research or other purposes. Typically, such data is stored in a data object, such as a table in a relational database. Each record (e.g., row) of the object often corresponds to one individual. Each record (and table) has a number of attributes (e.g., columns or fields), which can be divided into three categories. The first category includes attributes that clearly and directly identify individuals known as "explicit identifiers." Explicit identifiers include names, social security numbers, addresses, etc. The second category includes attributes that when taken together can potentially indirectly identify an individual, such as zip-codes, birthdate, gender, etc. These are known as "quasi-identifiers." The third category includes attributes that are considered personal, confidential, or private known as "sensitive identifiers" (e.g., disease and salary). Often, organizations seek to have access to the sensitive information for research purposes. Anonymization may thus be needed to suppress and/or obfuscate the explicit and/or quasi-identifier values.

SUMMARY

One or more embodiments are directed to a system, a computer program product, and a computer-implemented method. In some embodiments, the computer-implemented method includes the following elements. A first set of a data associated with one or more data stores is received. One or more strings of the first set of data are run through at least one word embedding vector model. The running includes causing at least one representation of the one or more strings to be mapped in vector space. The first set of data is anonymized based at least on the running of the one or more strings through the at least one word embedding vector model. The anonymizing includes suppressing one or more values of a first attribute and not suppressing one or more particular values of a second attribute.

In some embodiments, the system includes at least one computing device having at least one processor and at least one computer readable storage medium having program instructions embodied therewith. The program instructions can be readable or executable by the at least one processor to cause the system to perform the following elements according to some embodiments. A first set of a data associated with one or more data stores is received. The first set of data is run through a noise propagation module. The running includes adding noise to the first set of data. The adding of the noise includes causing at least a subset of the first set of data to be grouped together and represented as a single value for a particular attribute. The first set of data is anonymized based at least on the running of the first set of data through the noise propagation module. The anonymizing includes suppressing one or more values of a first attribute and not suppressing each particular value of a second attribute.

In some embodiments, the computer program product includes a computer readable storage medium having program instructions embodied therewith. The program instructions can be readable or executable by a computing device to cause the computing device to perform the following elements according to some embodiments. A first set of data associated with one or more data stores is received. A distance from a representation of a subset of the first set of data to at least a second representation of another set of data in vector space is identified. In response to the identifying of the distance, the first set of data is anonymized. The anonymizing includes adding noise to at least some of the first set of data.

Figure 1:
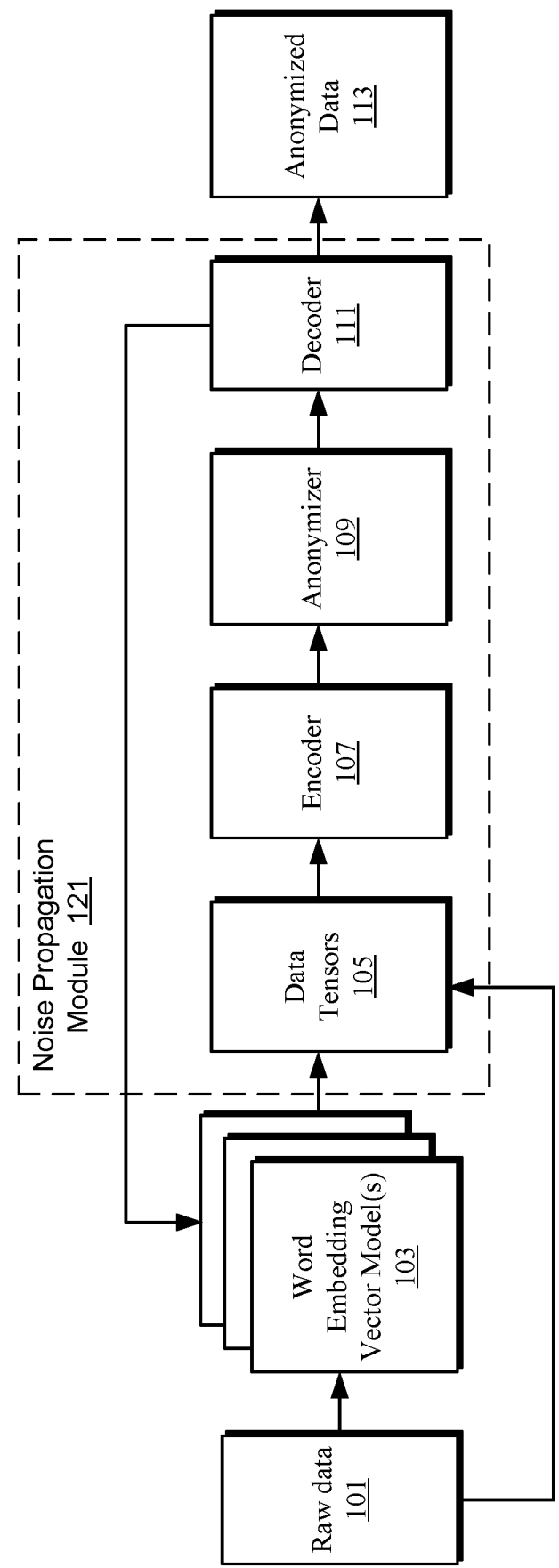
FIG. 1 is a block diagram illustrating an abstract view of the generation of anonymized data, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to noise propagation-based data anonymization. While the present disclosure is not necessarily limited to such applications, various aspects of the disclosure may be appreciated through a discussion of various examples using this context.

Anonymization mechanisms are focused not so much on whether a user is authenticated or has access to sensitive information as much as what values will constitute the information the user can view. For example, typical technical solutions perform restriction techniques, such as query restriction. Query restriction prohibits queries that can reveal sensitive information. This is implemented by suppressing all inferences to sensitive data (e.g., via encryption, access denial, etc.). In contrast, data anonymization provides a solution to first render data sufficiently anonymous but viewable, and then the resulting data used as the basis on which queries are processed.

One common problem facing the release of published data even with some anonymization is that data (e.g., quasi-identifier values) can be used to re-identify individuals by linking or matching the data to other data or by looking at unique characteristics found in the data. This is notwithstanding the fact the some explicit identifier value (e.g., a person's name) is suppressed or deleted from a database table. In an example illustration, a very public male individual may be included in a database record that includes attributes of "name," "birth date," "sex," "zip-code," and "disease." The explicit identifier value of "name" may be suppressed. However, the database table that includes the database record may only include 6 people that have the same birthdate as the public individual and only 3 of the people may be male. Further, this public individual may be the only one in the table with a particular zip-code. Accordingly, a person with knowledge that the public individual is in the table and knowledge of the public individual's birthdate and/or zip-code may easily be able to link or match these attribute values back to the individual and determine any sensitive data about the individual such as a particular disease that the public individual has experienced.

In order to combat this problem, some technical solutions employ algorithms that suppress data values and/or cluster certain data values that are semantically consistent such that more records will have identical quasi-identifiers at view time. This makes it harder to link any data back to a particular individual. For example, algorithms such as k-Anonymity, l-diversity, and t-closeness have been proposed. A table satisfies k-anonymity if every record in the table is indistinguishable from at least k−1 other records with respect to every set of quasi-identifier attributes. For l-diversity, an equivalence class has l-diversity if there are at least l "well-represented" values for the sensitive attribute(s). A table is said to have l-diversity if every equivalence class of the table has l-diversity. For t-closeness, an equivalence class has t-closeness if the distance between the distribution of a sensitive attribute in the class and the distribution of the attribute in the whole table is no more than a threshold t. A table is said to have t-closeness if all equivalence classes have t-closeness.

One problem with these solutions, such as t-closeness, is that the distance between categorical (or non-numerical) attributes, such as strings need to be manually specified by a user. This is also referred to as the generalization hierarchy for each attribute. Accordingly, categorical equivalence class definitions, attribute boundaries, attribute ranges, or splitting points must be manually determined by the user. An "equivalence class" as described herein is a set of records that has the same values for all or some of the quasi-identifier attributes. For example, an equivalence class can include a series of records that specify in an "age" attribute that each person is less than or equal to 40. Typically, users must define the "less than or equal to 40" attribute range and determine that its record range is proportional to other equivalence classes and that there are no other confounding variables. This manual specification can cause a non-uniform or biased representation of equivalence classes such that the utility and reliability of the data suffers. Moreover, it can be time consuming to manually define such distances.

Another issue is that some solutions perform analyses on data records in the order or vector space that the data is represented. A data record is an n-dimensional vector where each dimension corresponds to an attribute of the record. Accordingly, it is possible that there exists a representation of a data record (different from the one in which the data was acquired) that, on one hand, will lend itself to anonymization, and on the other hand, better preserve the utility of the data. Therefore, embodiments of the present disclosure address some or each of these issues and improve anonymization and database view technologies as described in more detail below.

FIG. 1 is a block diagram illustrating an abstract view of the generation of anonymized data, according to embodiments. At least some of the raw data 101 (e.g., categorical attribute values) is fed through the word embedding vector model(s) 103. In some embodiments, a set of the raw data 110 (e.g., real numbers of database records) bypasses the word embedding vector model(s) 103 and is translated into a subset of the data tensors 105. A word embedding vector model maps the raw data 110 to one or more points in vectors space (e.g., real numbers in a 2D or 3D graph model) according to a context similarity (e.g., semantic meaning) to other data points (e.g., other string representations) in vector space. The word embedding vector model 103 is or includes various methods to generate the mapping such as neural networks, dimensionality reduction, a co-occurrence matrix, probabilistic models, and/or any other suitable model. For example, in some embodiments, the word embedding vector model(s) 103 includes a Word2Vec model. Word2Vec models and word embedding vector model(s) 103 are described in more detail below.

After the raw data 101 is fed through the word embedding vector model(s) 103, it is fed through the noise propagation module 121 (e.g., a modified auto-encoder) where the data is first presented as data tensors 105. The noise propagation module 121 is a module that adds noise to the data. As shown in FIG. 1, the noise generation is performed using the anonymizer 109. The anonymizer 109 sits between the encoder 107 and the decoder 111 of the noise propagation module 121. The output of the encoder 107 is one or more "codes." The one or more codes generated by the encoder 107 are input to the anonymizer 109. In embodiments, the anonymizer 109 ensures that appropriate noise is added to codes such that they are clustered or grouped and each cluster has at least k-members. The anonymizer 109 thus generates noisy code. The noisy codes are then fed to the decoder 111, which then reconstructs data. The reconstructed data is then passed according to a policy (e.g., through a nearest neighbor decoder) to generate anonymous data. Although the noise propagation module 121 is illustrated as including the data tensors 105, the encoder 107, the anonymizer 109, and the decoder 111, it is understood that this is representative only and that more or less components can exist within any suitable noise propagation module.

In embodiments, adding noise includes adding data to or changing original data points or set of data points with a random variable or set of variables to come up with a new variable or set of variables. For example, in some embodiments additive noise is generally includes a representation as $Z=X+\varepsilon$, where Z is the transformed data point, X is an original data point, and $\varepsilon$ is a random variable (noise) with a distribution $e\sim N(0, \sigma^2)$. In an example illustration of noise, one of the data tensors 105 can represent an integer corresponding to age, which is 27. However, when this integer gets fed through the noise propagation module 121, its anonymized data 113 version can be ≤30 because an entire equivalence class or other policy can be defined using this identifier.

Data tensors 105 as described herein are representations of data in a different form that the data itself, such as a token representing the data. For example, if strings (e.g., human readable words) are fed through the word embedding vector model 103, the output in embodiments is the data tensors 105, which may all be represented as integers or other real numbers.

The encoder 107 learns the weights and extracts base features of the data tensors 105 and/or other real numbers that correspond to the most relevant information and maps or projects each of the data tensors 105 to a different dimension (e.g., codes). For example, the data tensors 105 in some embodiments are mapped from its high dimensionality space to a lower dimensionality space (e.g., the data is compressed). The anonymizer 109 takes the mapped data and identifies the distances defined in the word embedding vector model(s) 103 to anonymize the data, which is described in more detail below. This data is then decoded via the decoder 111 in order to represent the data back to an original dimensionality (e.g., a non-compressed form), except that the data is represented as the data tensors' 105 nearest neighbors (or other contextually similar word) instead of the data tensors 105 themselves, which is described in more detail below. The nearest neighbors (or other representations) are the anonymized data 113. In some embodiments, after the decoder 111 turns the data into the anonymized data 113, the word embedding vector model(s) 103 is retrained, which is described in more detail below. This is indicated by the arrow from the decoder 111 to the word embedding vector model(s) 103.

Figure 2:
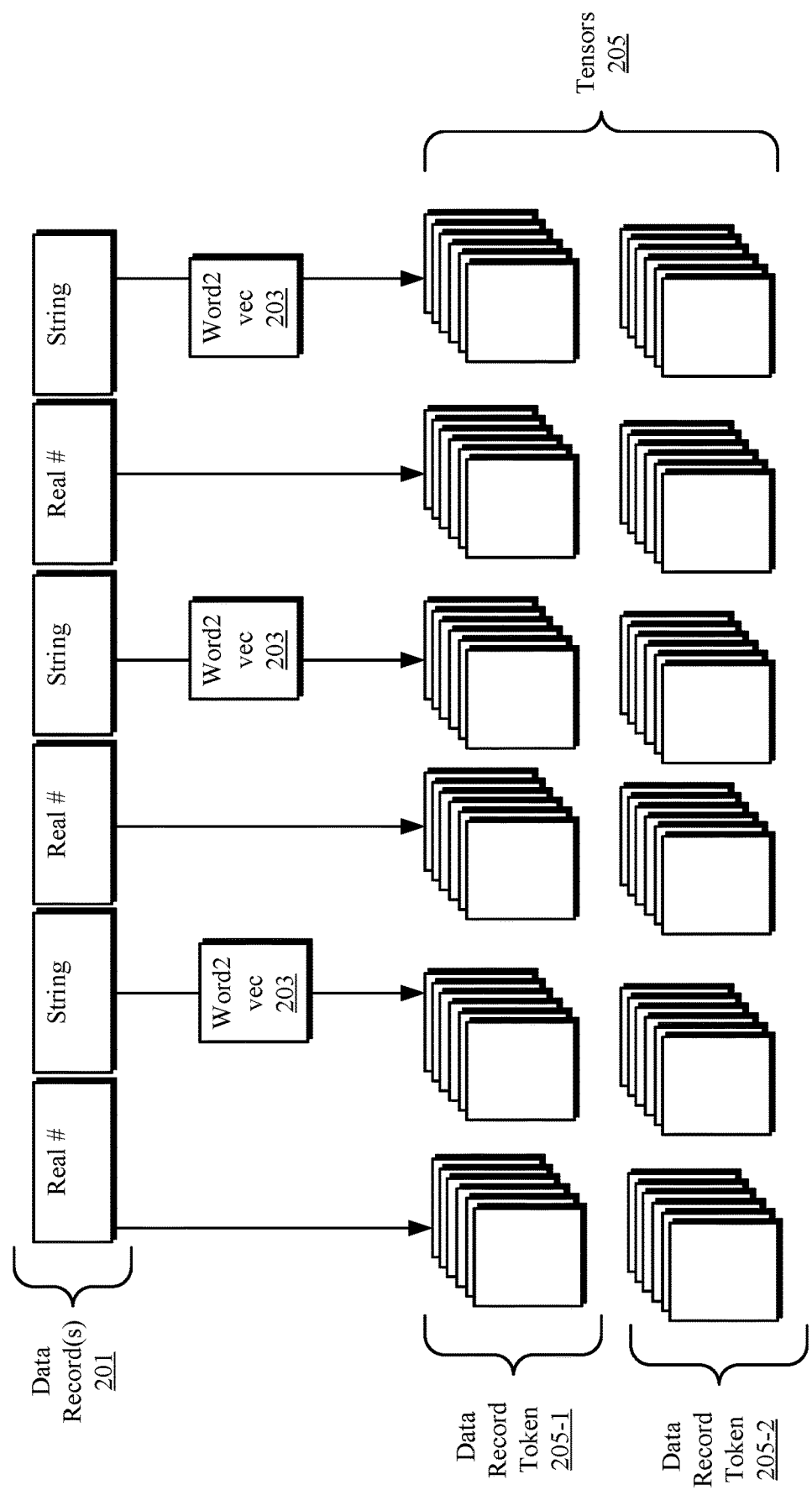
FIG. 2 is a block diagram illustrating how one or more data records are transformed into data tensors, according to embodiments.

FIG. 2 is a block diagram illustrating how one or more data records are transformed into data tensors, according to embodiments. The data record(s) 201 (e.g., a database record) include various fields or attributes with both real numbers and strings. Each real number attribute corresponds to one or more real number values (e.g., integers, floats) that can be associated with a person. For example, a real number can include quasi identifier values such as an age value (e.g., 30) or zip code value or a sensitive attribute value, such as a salary figure. Each string corresponds to one or more non-real number character or character combinations, such as natural language words (e.g., English words). For example, a string can be a sensitive attribute, such as a disease type value (e.g., "lung cancer") or other quasi-attributes such as a city, education level, or gender value.

As illustrated in FIG. 2, each of the real number attributes of the data record(s) 201 are represented as tensors 205 without any intermediate steps (e.g., being fed through a word embedding vector model). In order to represent each of the real numbers as a tensor value of the tensors 205, the entire set of real numbers in a data set (e.g., a set of records in a table, such as the raw data 101 of FIG. 1) are normalized. Normalizing data includes casting or re-representing one or more of the real numbers in one or more specific ranges, such as between 0 and 1 or −1 and +1. In some embodiments, normalization utilizes linear algebra to transform a data vector (e.g., the real numbers in the database record(s) 201) into a new vector (e.g., real numbers in the data record token 205-1) whose norm (i.e., length) is equal to one. In embodiments, normalization includes eliminating a unit of measurement by transforming the data into new scores with a mean of 0 and a standard deviation of 1. In an example illustration, the first attribute can include the age attribute, which has a value of 27. There can be several other records with corresponding age values of 22, 26, and 25. When each of these age attributes are normalized, in embodiments they are assigned to the same category of ≤30 such that a database view reveals that each of the age attributes read ≤30 instead of their individual values. Accordingly, the specific values take on a broader value representation.

Each of the string attribute values of the data record(s) 201 are run through the Word2vec 203. Although FIG. 2 illustrates a Word2vec model, it is understood that any suitable word embedding vector model can be utilized as described in FIG. 1. A Word2vec model is a two-layer network models that run one or more input vectors (word representations) through a hidden layer (i.e., a column-row matrix) and a projection layer (e.g., a softmax classifier). Word2vec models predict target strings from source context words (i.e., via the Continuous Bag of Words (CBOW) algorithm) or inversely predicts source-context words from target words (i.e., via the skip-gram algorithm). In embodiments, when each of the strings are run through a corresponding Word2vec or other word embedding model, the strings are numerically represented in a word embedding that shows associated vectors (e.g., other groups of string identifiers) and the distances from the string representations to each of those vectors, which is described in more detail below. For example, the string "male" can be represented as a "1" in vector space and the string "female" can be represented as a "0" in vector space.

After the normalizing of the real numbers and the word embedding analyses of the strings of the data record(s) 201, the data is represented in one or more data token records 205 (i.e., another vector with n dimensions). For example, the data record(s) 201 can be a first database record. When the real numbers get extracted/copied from the database record and are normalized and the strings are extracted and run through the word2vec model, the data can be pieced together again in the form of the data record token 205-1 (or 205-2). In embodiments, the data record token 205-1 is a vector of real numbers that represent the original data record 201. Each of the data record tokens 205-1 and 205-2 (and any quantity of records in a table) together form the tensors 205. In embodiments, the tensors 205 include just a single data record token, as opposed to the two 205-1 and 205-2 as illustrated in FIG. 2.

Figure 3:
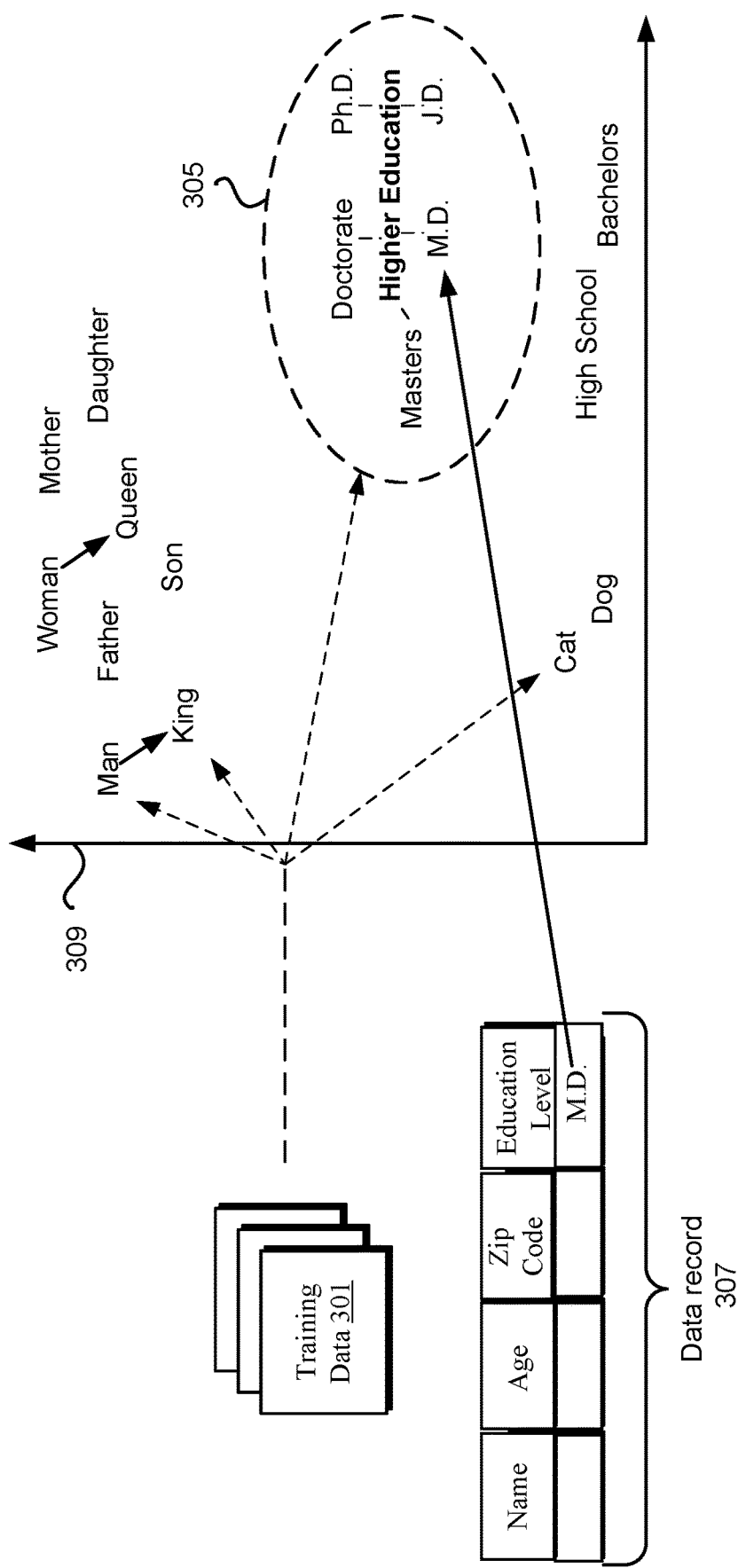
FIG. 3 is a schematic diagram illustrating how data record strings are run through a word embedding vector model, according to embodiments.

FIG. 3 is a schematic diagram illustrating how data record strings are run through a word embedding vector model, according to embodiments. In embodiments, FIG. 3 represents aspects of the word embedding vector model 103 of FIG. 1. FIG. 3 includes the training data 301, the data record 307, and the vector space 309. The vector space 309 includes multiple vectors (e.g., man, king). It is understood that although the vector space 309 is a representation with limited vectors and dimensions, more or less vectors and dimensions can be present with different, more, or fewer string representations. It is also understood that although the vector space 309 includes data points in string form (e.g., Man), in some embodiments, such as in Word2vec models, the data points are string representations (e.g., real number vector(s)). In some embodiments, a "String representation" or any other representation is a first set of data that has the same meaning, stands for, and/or is substituted for a second set of data but does not have the same exact value or format as the second set of data. For example, "Woman" can be a string and "0" could be its string representation. In other embodiments, a string representation or any other representation is the original data point itself. For example, "Woman" can be the original data point and "Woman" can also be the "string representation."

In order to plot data points or string representations within the vector space 309, the model is trained using the training data 301. In various embodiments, the training data 301 includes a large corpus of unstructured data (e.g., documents, news articles, social media posts, news feeds, blogs) and/or structured data (e.g., database values). The training data 301 is also the input of the word embedding vector model. The training data 302 includes each of the words as found within the vector space 309—man, king, father, son, woman, queen, mother, daughter, cat, dog, doctorate, Ph.D., J.D., masters, bachelors, and highs school—known as the "vocabulary" or "vocab".

In some embodiments, the vectors space 309 represents a "pre-trained" embedding. A pre-trained embedding is a static model that is generated without feedback, retraining, or reference to the data sets being fed through it. For example, a user may download a static word embedding vector model from an online source, which is already trained and includes the vectors or data points already mapped in vector space according to semantic similarity between words. In other embodiments, the vector space 309 represents a "retrained" embedding. A retrained word embedding model is an embedding that receives training feedback after it has received initial training session(s) and is optimized or generated for a specific data set (e.g., microdata, anonymized databases, etc.) For example, as illustrated in FIG. 1, after the decoder 111 decodes the data, the system "re-trains" the word embedding vector model(s) 103 a second time so that any vectors or words (e.g., M.D.) in a future data set are consistently mapped to its closest neighbor (e.g., higher education) or other word according to the policy implemented. In some embodiments, retraining includes issuing feedback to make sure the correct data point pairing (e.g., M.D. and higher education) is utilized.

In order to map each of the words to its contextually appropriate points in the vector space 309, training algorithms are utilized. For example, in some embodiments, the word embedding vector model is trained using the maximum likelihood (ML) principle to maximize probability of the next word $w_t$ (i.e., "target") given the previous words h (i.e., "history") in terms of a softmax function:

$$P(w_t \mid h) = \text{softmax}(\text{score}(w_t, h)) \quad \text{Equation 1}$$
$$= \frac{\exp\{\text{score}(w_t, h)\}}{\sum \text{word } w' \text{ in } Vocab^{\exp\{\text{score}(w', h)\}}}$$

Where score ($w_t$, h) computes the compatibility of word $w_t$ with the context h. The model is trained by maximizing its log-likelihood on the training set, that is maximizing $$J_{ML} = \log P(w_t \mid h) \quad \text{Equation 2}$$
$$= \text{score}(w_t, h) - \log\left(\sum \text{Word } w' \text{ in Vocab} \exp\{\text{score}(w', h)\}\right)$$

This yields a properly normalized probabilistic model for language modeling. Each probability is computed and normalized using the score for all other words w' in the current context h at every training step. In some embodiments some models, such as word2vec, are trained using a binary classification objective, such as logistic regression, to discriminate the real target words $w_t$ from K noise words w", in the same context. Accordingly, instead of a softmax classifier, a noise classifier is used.

The output of the training algorithms is each of the positional words in the vector space 309, which shows groupings of words that are semantically similar. "Semantic similarity" is the semantic distance between two or more concepts (e.g., words) according to a given ontology. An "ontology" is a class or data set that includes a set of attributes (e.g., words). For example, the words of "doctorate," "Ph.D." (Doctor of Philosophy), M.D." (Medical Doctor), "J.D." (Juris Doctor), and "masters" each belong to the ontology of "higher education" 305, while the words "bachelors" and "high school" belongs to the ontology of "undergraduate". The "distance" between any two or more words in some embodiments is based on the similarity of their meaning and/or semantic content, as opposed to any syntax similarity, such as string format. For example, "car" and "far" are syntactically similar but have two different definitions so they are not semantically similar.

The distance between any two vectors or words are measured according to any suitable method. For example, in some embodiments, automated cosine similarity is used to compute distance. Cosine similarity is a measure of similarity between two non-zero vectors of an inner product space that measures the cosine of the angle between the two non-zero vectors. No similarity is expressed as a 90 degree angle, while total similarity (i.e., the same word) of 1 is a 0 degree angle. For example, a 0.98 distance between two words reflects a very high semantic similarity while a 0.003 distance reflects little semantic similarity. As illustrated in the vector space 309, the cosine similarity between "man" and "king" and "woman" and "queen" are the same cosine distance, thus king in certain situations is semantically similar to queen given the inputs of man and woman.

After the training data 301 is run through the training algorithm and represented as the vector space 309, the data record 309's string attributes are run through the word embedding vector model and plotted in the vector space 309. For example, as illustrated in FIG. 3, the only string value in the data record 307 is "M.D.," which corresponds to the "education level" attribute. "M.D." is extracted or copied from the data record 307 and placed in the vector space 309 according to the ontology it belongs to and/or its semantic similarity to other words or data points. After the plotting, "M.D.'s" distance to other words or vectors scan then be computed in an automated fashion in word embedding models, which is used to help re-define (e.g., generalize) attribute values and/or equivalence classes in anonymized data, as opposed to manually defining distances of words. As illustrated in the vector space 309, "M.D.'s" closest neighbor in terms of distance is "higher education." Accordingly, when data records include values of "M.D.," "doctorate," "Ph.D," "J.D.," or "Masters," an equivalence class or attribute values can be generated using the string "higher education" to replace each of these individual attributes for view time in order to help anonymize the data. Accordingly, "higher education" is a broader representation than each of the individual values but still defines a relevant class of the individual values such that a balance is struck between not linking specific information to an individual while at the same time making the data reliable for research or other purposes.

Figure 4:
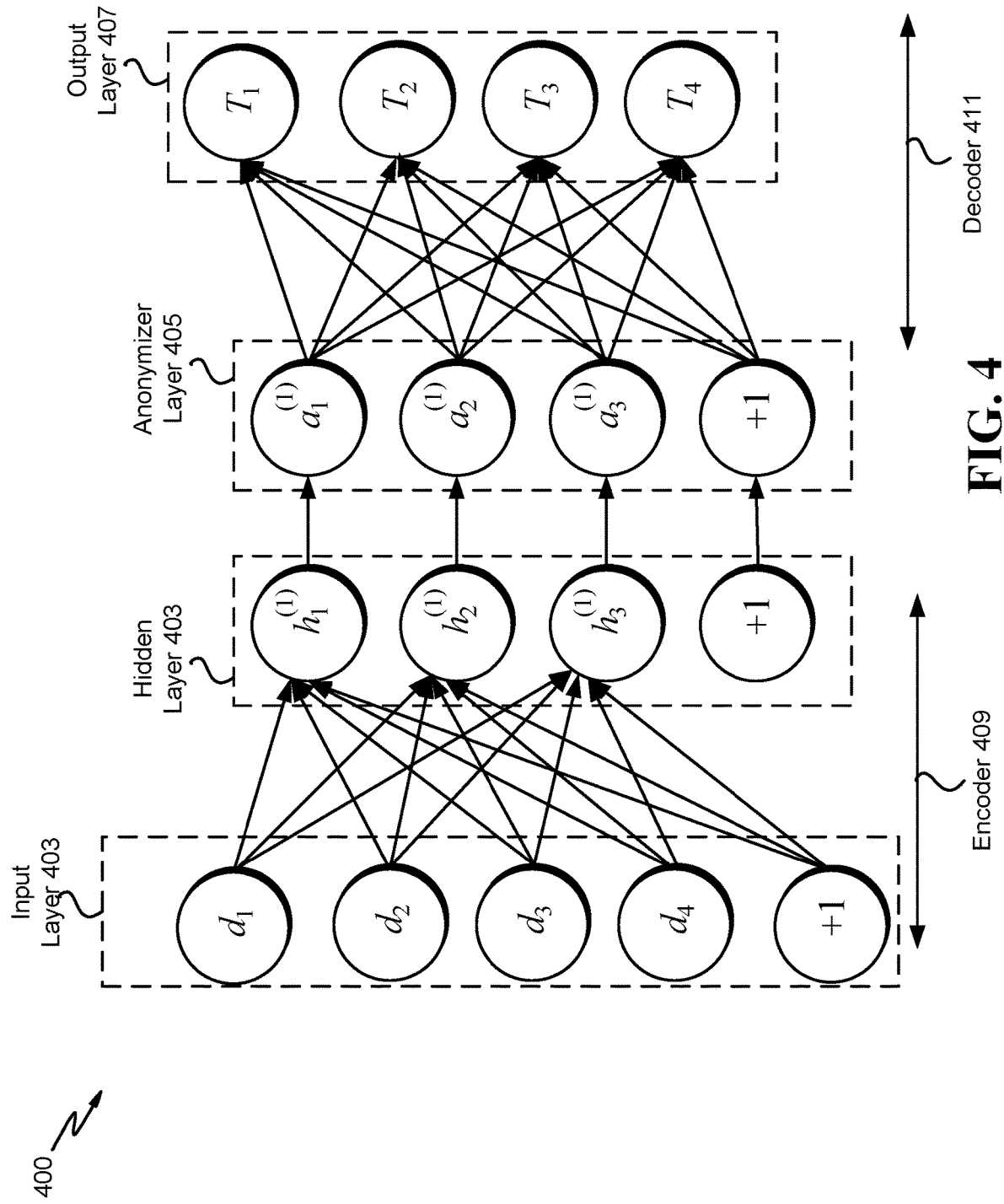
FIG. 4 is a schematic diagram illustrating a noise propagation module, according to embodiments.

FIG. 4 is a schematic diagram illustrating a noise propagation module 400 (e.g., the noise propagation module 121 of FIG. 1), according to embodiments. The noise propagation module 400 includes an input layer 403, a hidden layer 403, an anonymizer layer 405, and an output layer 407 as a neural network. In some embodiments, the noise propagation module 400 includes an auto-encoder with an anonymizer layer 405 added in between the hidden layer 403 and the output layer 407.

The input layer 403 includes a plurality of data points—$d_1$, $d_2$, $d_3$, $d_4$ (e.g., data records represented as tensors). For example, referring back to FIG. 3, one of the data points $d_1$ can be the data record 307 represented as a token record and the rest of the additional data records together can include a 300 dimensional vector. The encoder 409 maps each data point to a representation point h (e.g., $h_1$, $h_2$, or $h_3$) (h=f(d)). The mapping of the entire data set includes extracting relevant features or weights associated with the data points and projecting the features from a first dimension (e.g., a higher dimension) to another dimension (e.g., a lower dimension). For example, a 300 dimensional vector represented as a table of token records ($d_1$, $-d_4$) can be mapped to a 100 dimensional vector ($h_1$, $-h_3$). This can be useful for principles such as data compression, which reduces dimensionality by removing static or non-important features of data. This reduces memory consumption and/or processing time.

Each data point within the hidden layer 403 is then mapped to another representation of the same or analogous dimension within the anonymizer layer 405. In some embodiments, the processing for this mapping includes first using a Mondrian algorithm. The Mondrian algorithm is a generalization algorithm that uses greedy recursive partitioning of the quasi-identifier domain space to satisfy k-anonymity. "Generalization" replaces or changes quasi-identifier values with values that are less-specific but semantically consistent (e.g., values that belong to the same ontological class). As a result, more records will have the same set of quasi-identifier values. The Mondrian algorithm recursively chooses the split attribute with the largest normalized range of values and (for continuous or ordinal attributes) partitions the data around the median value of the split attribute, which is repeated until there is no allowable split.

The output of the Mondrian algorithm is a set of equivalence classes, where each equivalence class is of size at least k to meet k-anonymity. The equivalence class members at this point can be codes (derived from the data vectors using the encoder 409). A centroid (e.g., an average or median position/value) of the equivalence class can be used as the generalization of all the codes in the class. For example, if c1, c2, c3, and c4 are the codes in the equivalence class E1, and C is the centroid, which is computed using the codes, then C is treated as representative of E1. The codes c1 is mapped to C, c2 is mapped to C, c3 is mapped to C, c4 is mapped to C. Accordingly, at the output of the anonymizer layer 405 (e.g., the anonymizer 109 of FIG. 1), the c1, c2, c3, and c4 are indistinguishable. They are all represented by noisy code C. In some embodiments, different equivalence classes have different centroids and thus different outputs. These centroids can be decoded by the decoder 411.

In an illustration of the actual mapping from the hidden layer 403 to the anonymizer layer 405, $d_1$, $d_2$, and $d_3$ can together be compressed and thus represented as $h_1$ in the hidden layer 403. Then the $h_1$ representation can be mapped to another or different value $a_1$ that includes the same dimension as $h_1$. Each of the data points within the anonymizer layer 405 is then projected to a data point in the output layer 404 via the decoder 411, which is represented by (T=g(a)), where g is some noise variable.

In some embodiments, each data point within the hidden layer 403 is mapped to a compressed version of the data points' nearest neighbor, its ontological class, and/or other semantically similar word. For example referring back to FIG. 3, because the string "M.D." has already been mapped in a model's vector space 306, its distance is already calculated to its neighbors and each word that it is semantically similar to is already mapped. Accordingly, if a policy specified to find the input string "M.D.'s" nearest neighbor, it would use "higher education" as a data point. Accordingly, once the nearest neighbor is determined, it is compressed to the same or similar dimension as one of the data points in the hidden layer 403. Then, for the output layer 407, the compressed version of "higher education" (e.g., $a_1$) is then mapped to its original dimension (e.g., non-compressed) version (e.g., $T_1$) such that the string "higher education" can now be used as one or more values for the an education level attribute, instead of or in place of individual education level values, such as "M.D." or "Ph.D.," etc.

Figure 5:
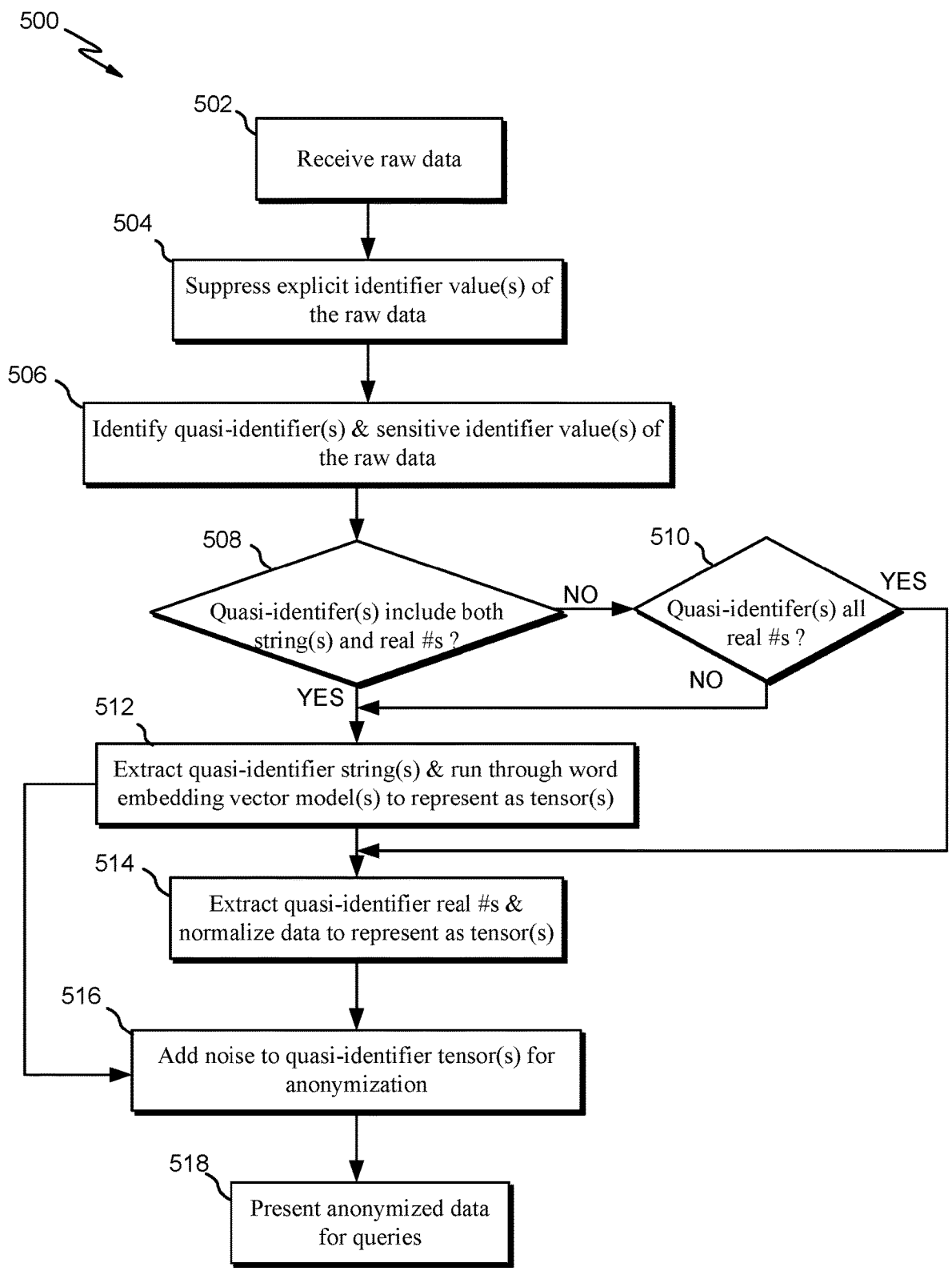
FIG. 5 is a flow diagram of an example process for anonymizing data, according to embodiments.

FIG. 5 is a flow diagram of an example process 500 for anonymizing data, according to embodiments. The process 500 (as well as any other processes disclosed herein, e.g., 600, 700) can be performed by processing logic that comprises hardware (e.g., circuitry, dedicated logic, programmable logic, microcode, etc.), software (e.g., instructions run on a processor to perform hardware simulation), firmware, or a combination thereof.

Per block 502, raw data (e.g., the raw data 101 of FIG. 1) is received. The raw data comes in any suitable form, such as one or more database records, unstructured data, and/or any other set of data. Per block 504, one or more explicit identifier (e.g., a name of a person, social security numbers) values of the raw data are suppressed. "Suppressing" the values is or includes deleting, masking, changing, and/or encrypting a data set such that the values are not discernable to a human reader. In some embodiments, the data used in the process 500 is not necessarily "raw" data, but can be any set of data.

Per block 506, one or more quasi-identifier (e.g., zip code, education level, etc.) values and one or more sensitive identifier (e.g., disease type, salary, etc.) values of the raw data are identified. In some embodiments, a user first defines what the quasi-identifier(s) and the sensitive identifier(s) are and inputs this definition to a computing system. The quasi-identifiers can be set to any attribute class notwithstanding that some attributes are typically in other categories. For example, in some embodiments typical "sensitive" attributes, such as disease and salary are defined as the quasi-attributes. Typical "explicit" identifiers (e.g., name, social security) can also be set as the quasi-attributes. In some embodiments, the computing system, as opposed to a user, identifies each identifier type without user feedback via any suitable method, such as Natural Language Processing (NLP), policy-based word matching and tagging (e.g., matching a string in a database to a string in a data structure with a rule that the word is a particular identifier), etc.

Per block 508, it is determined whether the one or more quasi-identifier values include both real string(s) and real number values, such as integers (e.g., via NLP, user-defined specification, etc.). Per block 510, if the one or more quasi-identifier values do not include both string(s) and real numbers (i.e., the quasi-identifier value(s) are either real number(s) or string(s) but not both), then it is determined whether the quasi-identifier(s) are all real numbers. If the one or more quasi-identifiers are all real numbers, then per block 514 the one or more quasi-identifier real numbers are extracted and normalized and represented as one or more tensors (e.g., the real number representation of the data record token 205-1 of FIG. 2). If the one or more quasi-identifier values are not all real numbers (e.g., they are all strings), then per block 512, the one or more quasi-identifier strings are extracted and run through one or more word embedding vector models (e.g., word embedding vector model 102 of FIG. 1) and represented as one or more tensors or tensor values (e.g., the string representation of the data record token 205-1 of FIG. 2). Then in some embodiments, block 516 occurs after block 512 since there are no real numbers to normalized.

Per blocks 512 and 514, if the one or more quasi identifiers include both string(s) and real number(s), then both the quasi-identifier string(s) and the quasi-identifier real number(s) are extracted and either run through one or more word embedding vector models or normalized respectively. The resulting output of the normalization and the one or more word embedding vector models is data tensors.

Per block 516, noise is added (e.g., by the noise propagation module 121 of FIG. 1) to the quasi-identifier tensor(s) for data anonymization. Per block 518, the anonymized data is presented for queries. For example, in some embodiments the final data set includes the suppressed explicit identifiers, the anonymized quasi-identifier values, which have been generalized to one or more specific automated attribute values and equivalence classes, and the sensitive identifier value(s) in a non-altered (e.g., not suppressed or obfuscated) form. Accordingly, when a user issues a query for some or all of the data, he/she may view the data as it is specified in block 518.

Figure 6:
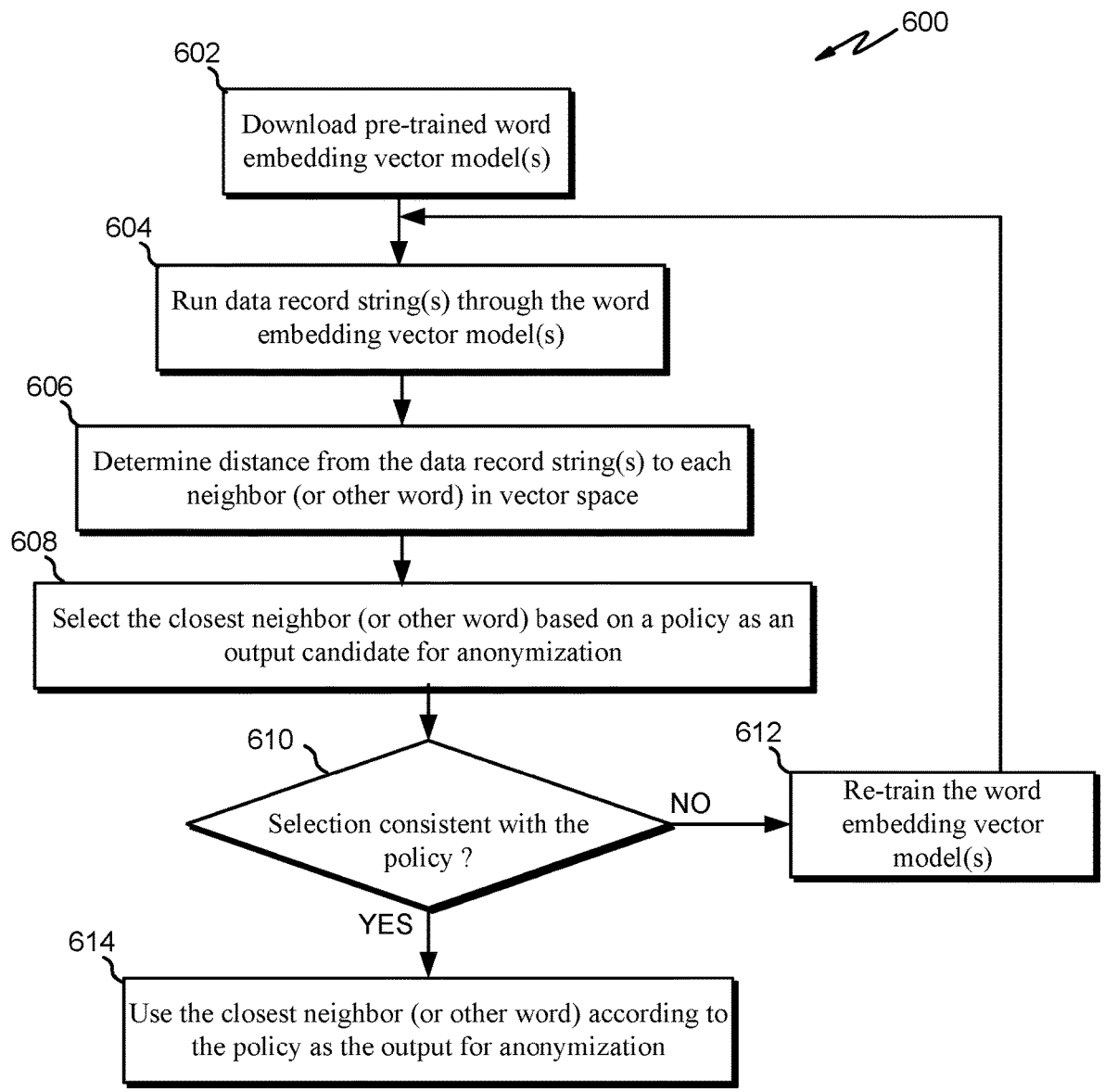
FIG. 6 is a flow diagram of an example process for running data through one or more word embedding vector models, according to embodiments.

FIG. 6 is a flow diagram of an example process 600 for running data through one or more word embedding vector models, according to embodiments. At block 602, one or more pre-trained word embedding vector models are downloaded. For example, a computing system in some embodiments receives a user request to download, from a website or other service, a word embedding vector model, such as a word2vec, which has each of its data points already mapped in vector space (e.g., the vector space 309 of FIG. 3). Accordingly, at some previous time, one or more sources, such as documents, social media posts, blogs, news feeds, dictionaries, periodicals, etc. have been run through the word embedding vector model and its corresponding string representations are mapped according to semantic similarity.

Per block 604, at a second time, one or more data record strings (e.g., a table of database records) are run through the word embedding vector model(s). Accordingly, the one or more data string representations are mapped into the vector space according to the semantic similarity of other string representations that were mapped at the pre-training phase. For example, referring back to FIG. 3, the string "M.D." is mapped within the vector space 309 as illustrated.

Per block 606, the distance (e.g., cosine distance) is determined from the one or more data record string representations to each neighbor (or other word) in vector space. In some embodiments, only each of the one or more data record strings' neighbors (i.e., the immediate words surrounding the one or more data record strings) are used to calculate distance to the one or more data record strings. In other embodiments, the distance is calculated from the one or more data record strings to each word (not just neighbor) within the vector space (e.g., the vector space 309).

Per block 608, the closest neighbor (or other word) is selected as an output candidate for anonymization based on a policy. In some embodiments, the policy specifies to select the word closest to the string representation in distance as a candidate for anonymization. For example, referring back to FIG. 3, if the one or more data record strings included "M.D.," M.D.'s closest neighbor in distance is "higher education." Therefore, "higher education" in some embodiments is selected as the output candidate for anonymization. In other embodiments, the policy specifies to select other word representations that are not necessarily the closest neighbor to the one or more data record string representations as the candidate, such as selecting the ontology or another neighbor of the one or more data record strings. For example, referring back to FIG. 3, instead of selecting the nearest neighbor "higher education" as the candidate, the policy can specify choosing a word at a particular distance from M.D., which can be "J.D." or "doctorate" etc. In some embodiments, the policy specifies grouping each data record within an ontology and using the same value for a particular attribute, which is not necessarily the name of the ontology. For example, if a plurality of data records included strings corresponding to each string within the ontology 305, the policy can specify to change each value of a level of education to one of the strings, such as "J.D." (instead of "higher education") in order to keep a person from being identified.

Per block 610, it is determined whether the selection at block 608 is consistent with the policy. This is determined by quantitative measures (e.g., whether the candidate is indeed the closes neighbor) and/or qualitative measures (e.g., whether the candidate represents the one or more data record strings in an accurate manner). In an example illustration of the qualitative measure, the string "M.D.'s" closest neighbor can be "J.D." instead of "higher education." Although a policy can specify to choose the closest neighbor and the algorithm has indeed chosen the closest neighbor, it may not adequately represent the class that "M.D." belongs to. This can be decided by a user, which determines that it wants "M.D." to be represented as more of generalized class or ontology instead of an inaccurate specific value. Thus, in this situation the candidate selection of "J.D." would be inconsistent with the policy even though quantitatively the policy was calculated correctly. In some embodiments, there is no user feedback, but instead an unsupervised algorithm is used to determine whether the selection is consistent with the policy or used to re-train. In these embodiments, a set of rules can be used to determine whether the selection is consistent with the policy, such as whether the selection was quantitatively accurate and whether the selection met one or more rules (e.g., whether the selection was the name of the ontological class).

Per block 612, if the selection of block 608 is not consistent with the policy the word embedding vector model(s) are re-trained. For example, a user or unsupervised algorithm can upload several other various source documents into the model and/or manually change where one or more strings are mapped in vector space. For example, referring back to FIG. 3, if "higher education" is associated with the data record string(s), the user or unsupervised algorithm can upload additional documents relating to education, such as specialized website pages that define and discuss various levels of education, selected dictionary words, news articles discussing education, etc. In another example, if "M.D." was included in the one or more data record strings, a user can move "higher education" closest to M.D. such that upon another run, "higher education" is selected as the candidate instead of some other word. After the data is re-trained at block 612, the one or more data strings are again run through the word embedding vector model(s) at block 604. Blocks 606 and 608 are repeated for the second run until the selection is consistent with the policy at block 610.

Per block 614, if the selection at block 608 is consistent with the policy, the closest neighbor (or other word) is used as the actual output for anonymization according to whatever the policy is. For example, referring to FIG. 1, the string(s) that is used as the output at block 614 in some embodiments is represented in the anonymized data 113.

Figure 7:
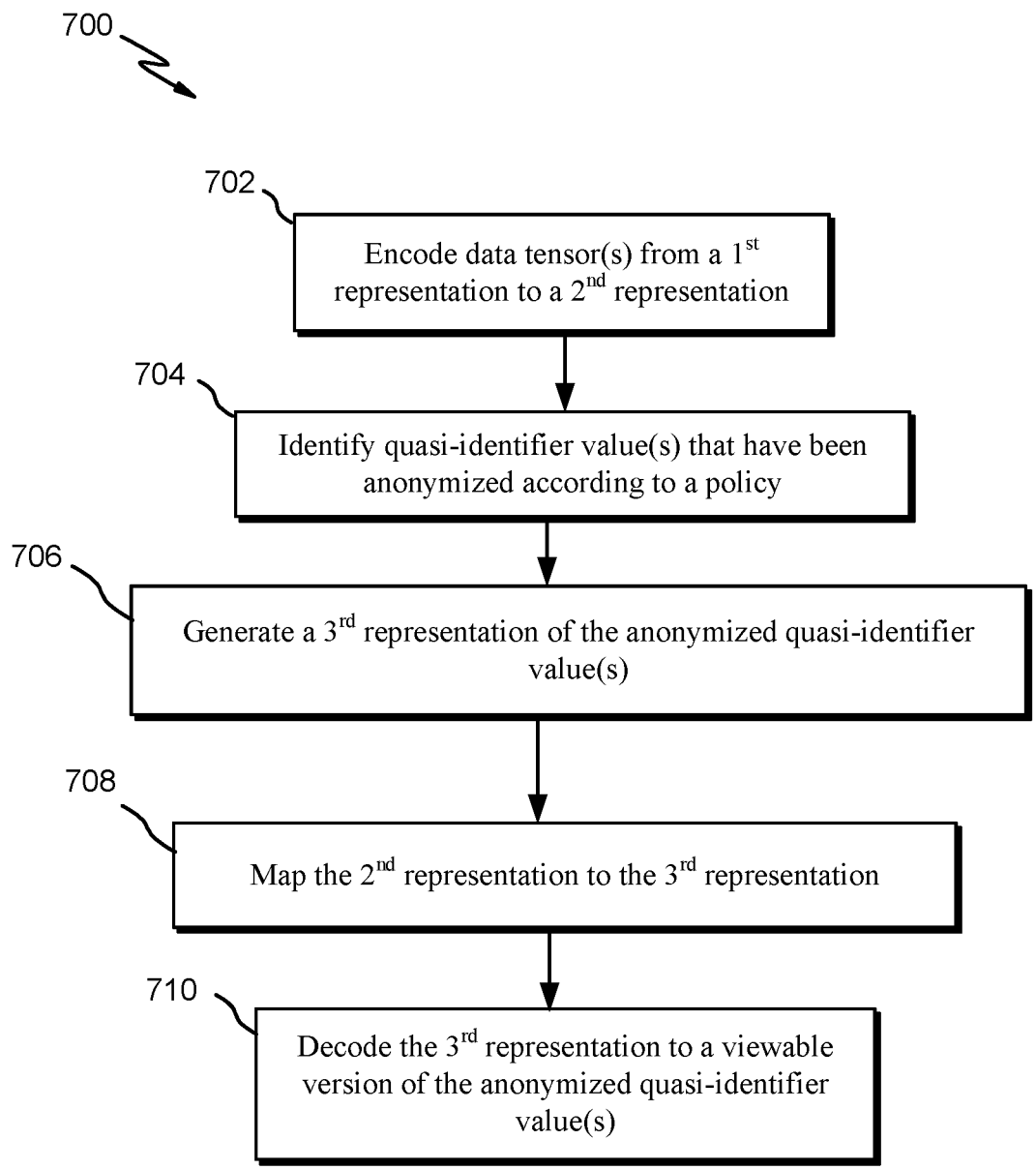
FIG. 7 is a flow diagram of an example process for running data through a noise propagation module, according to embodiments.

FIG. 7 is a flow diagram of an example process 700 for running data through a noise propagation module, according to embodiments. Per block 702, one or more data tensors (e.g., the data tensors 105 of FIG. 1) are encoded from a first representation to a second representation. For example, the data tensors can be a plurality of data record tokens that are projected from a higher dimension to a lower dimension as described in FIG. 4. In embodiments, the encoding includes learning the weights or most relevant information from the data tensor(s) and maps that information to the second representation, which in some embodiments is a condensed or compressed version of the first representation.

Per block 704, quasi-identifier value(s) that have been anonymized according to a policy are identified. For example, referring back to FIG. 6, the output for anonymization as specified in block 614 is identified. Per block 706, a third representation of the quasi-identifier value(s) identified at block 704 are generated. For example, in some embodiments, the quasi-identifier value(s) identified at block 704 are compressed to the same or analogous dimensionality as the second representation.

Per block 708, the second representation is mapped to the third representation. In some embodiments, this mapping guarantees that upon decoding, the original input (i.e., the first representation) is not re-generated as is done in typical auto-decoders, but rather another set of data is generated and decoded. In embodiments, this occurs in order to generalize and replace the quasi-identifier value with quasi-identifier values that are less-specific but semantically consistent.

Per block 710, the third representation is decoded to a viewable version of the anonymized quasi-identifier value(s). For example, the third representation can be a compressed version that is decoded into a non-compressed version. In an example illustration of the "viewable version," at view time after a query is issued by the user, the query processor can de-compress and present or display the anonymized quasi-identifier values (and the rest of the data) in a schema analogous to the table 830 of FIG. 8 described below.

Figure 8:
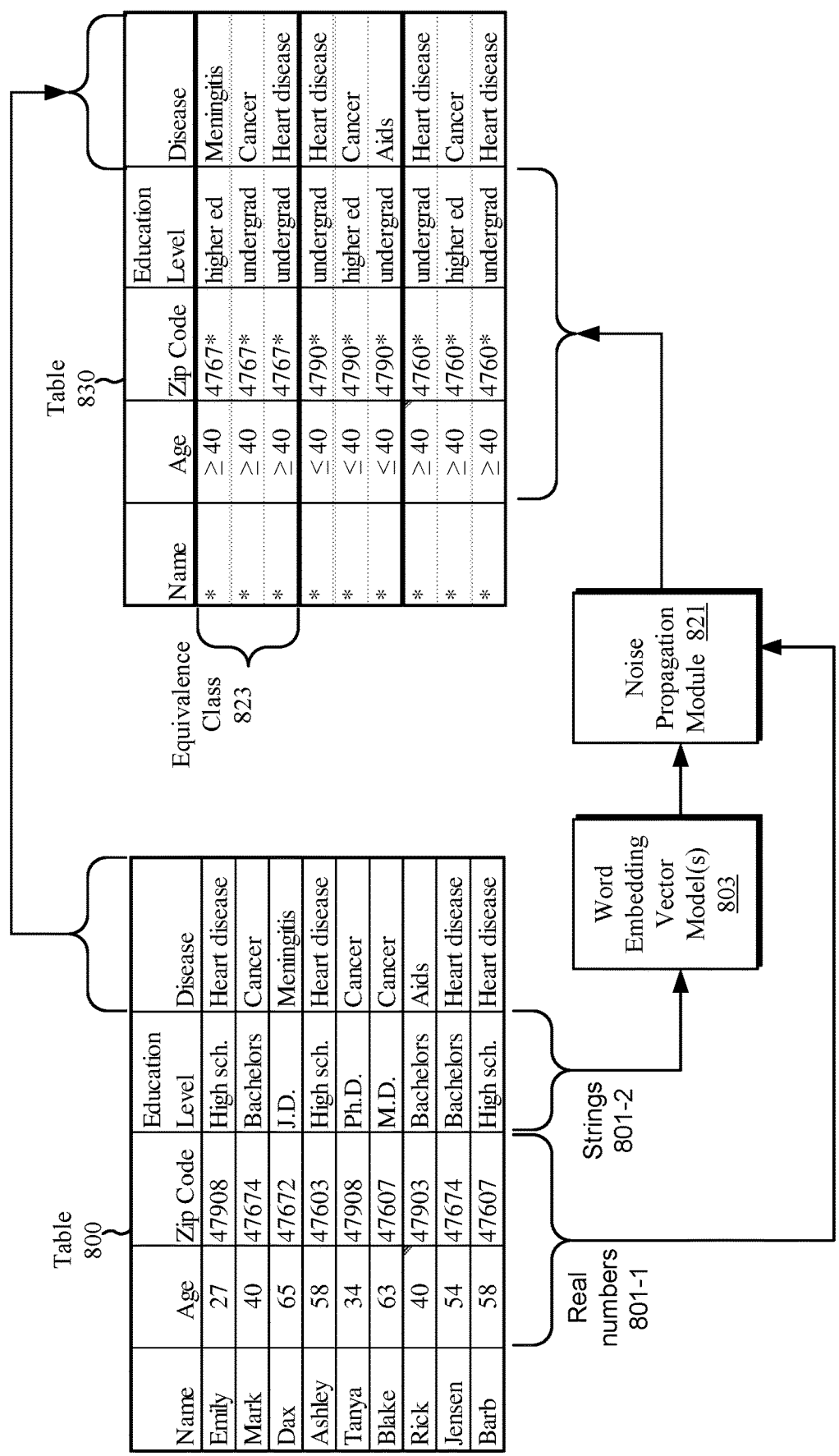
FIG. 8 is a schematic diagram illustrating how an anonymized database can look at view time, according to embodiments.

FIG. 8 is a schematic diagram illustrating how an anonymized database can look at view time, according to embodiments. FIG. 8 includes the table 800, which represents a private database and the table 830, which represents the same table 800 in anonymized form. As illustrated in the tables 800 and 830, there are a plurality of records corresponding to individuals, which are identified under the "Name" attribute (e.g., the explicit identifier). Each of the database records include specific values (e.g., 65) within the attributes of "Age," "Zip Code," "Education Level," (e.g., the quasi-identifiers) and "Disease" (e.g., the sensitive identifier). Although the tables 800 and 830 list particular attributes, records, and values it is understood they are representative only and that any quantity, representation, or type of attributes, records, and values can be present.

The table 800 lists data in unaltered form such that every value is discernable and can easily be linked back to an individual. Accordingly, no data values have been suppressed or otherwise obfuscated (e.g., generalized). It is typically undesirable to publish data analogous to the table 800 because it contains private data that others can link to individuals they know. Accordingly, anonymization techniques are performed to anonymize some or all of the data such that sensitive information cannot be linked to individuals while at the same time keeping desired data unaltered (or minimally altered) for research or other purposes.

In order to anonymize the data in the table 800, each of the string values 801-2 within the "Education Level" attribute are extracted or copied from the table 800 and run through the word embedding vector model(s) 803 (e.g., word embedding vector model(s) 103). Accordingly, each of the string values 801-2 are mapped within vector space (e.g., vector space 309) according to the semantic or other contextual similarity to other words. The distance from each of the string values 801-2 to some or each of the other words in the word embedding vector model(s) 803 are calculated. A policy is queried to determine what word(s) are used for the anonymized table 830 for the "Education Level" attribute. One policy is to choose the closest neighbor of each of the string values 801-2, which is either "higher education" or "undergraduate," such as illustrated in the vector space 309 of FIG. 3

Each of the real number values 801-1 are also extracted or copied from the table 800 and are normalized as described above. In some embodiments, a second policy or set of policies are defined, which provide class boundaries or ranges for some or each of the real number values 801-1, such as k-anonymity, t-closeness, and/or l-diversity policies. For example, the policy as shown in table 830 includes grouping database records by zip code range and age range.

Each of the real number values 801-1 and the string values 801-2 are run through the noise propagation module 121 (e.g., the noise propagation module 121 of FIG. 1) in order to add noise to the real number values 801-1 and the string values 801-2 according to the particular policies utilized as described above. For example, one policy can specify finding the closest neighbor to each of the string values 901-2 and representing each of the values by that closest neighbor. As illustrated in FIG. 8, each of the education level string values of "high school," "bachelors," "J.D.," "M.D.," and "Ph.D," of table 800 are mapped to their closest neighbors, which are either "undergraduate," or "higher education," as illustrated in the table 830 under the "education level" attribute. Accordingly, when a user issues a query, "higher ed" or "undergrad" is displayed instead of the individual education levels shown in the table 800.

In some embodiments another set of policies can specify defining the range boundaries and/or the splitting point of each equivalence class by a real number range, such as age range and/or zip code range. For example, FIG. 8 illustrates that each of the age attribute real number values (27, 40, 65, 58, 34, 63, 40, 54, 58) in table 800 are defined as less than or equal to 40 or greater than or equal to 40 years old (a policy) as illustrated under the age attribute of table 830. Each of the zip code real number values as represented in table 800 are grouped according to the last 3 numbers of a given zip code being identical, with the last number being suppressed (another policy), as shown under the zip code attribute of table 830. Accordingly, when a user issues a query, ≤40, ≥40, 4767*, 4790*, or 4760* is displayed instead of the individual age and zip code values shown in the table 800.

The "disease" attribute values of table 800 remain unaltered as illustrated by the "disease" attribute column of FIG. 830 according to the policies as implemented within the noise propagation module 821. Accordingly, noise is not added to these sensitive attribute values. Although each of the "disease" attribute values are unaltered, as far as suppression (i.e., they are completely viewable), the record order from top to bottom is changed according to the policies as specified above. Each of the "Name" attribute values of the table 800 are also suppressed as illustrated under the "Name" attribute column of the table 830 because names are not important for the research purpose of FIG. 8. It is also desirable not to be able to link the unaltered "disease" attribute values to any particular name. As illustrated, none of the name attribute values have noise added to them as they are not run through the noise propagation module 821.

The output of database records and their values in table 830 illustrate that there are three equivalence classes, which includes the equivalence class 823. An equivalence class is a set of data records in an anonymized object that have the same values for at least one of the quasi-identifier attributes. Accordingly, an equivalence class is a subset of data that is grouped together and are represented as a single value for a particular attribute. The equivalence class 823, for example, illustrates that each of the records have the same value≥40 within their respective "Age" attribute and "4767*" within their respective "Zip Code" attribute. However, the "Education Level" values are not the same for each record, as the values are either "higher Ed" or "undergrad."

Equivalence classes can be organized in any suitable manner. FIG. 8 illustrates that the equivalence classes are organized according to the age and zip code ranges. However, in some embodiments, equivalence classes can in addition or instead be organized using the "sensitive" attributes and/or other quasi-attributes. For example, in some embodiments, the "Education Level" values in the table 830 are the same for a particular equivalence class. In an illustrative example, there are three records that have a "higher ed" value and each of these records can be grouped into an equivalence class. In another illustrative example, all "heart disease" values and their corresponding records can be grouped together in an equivalence class.

Figure 9:
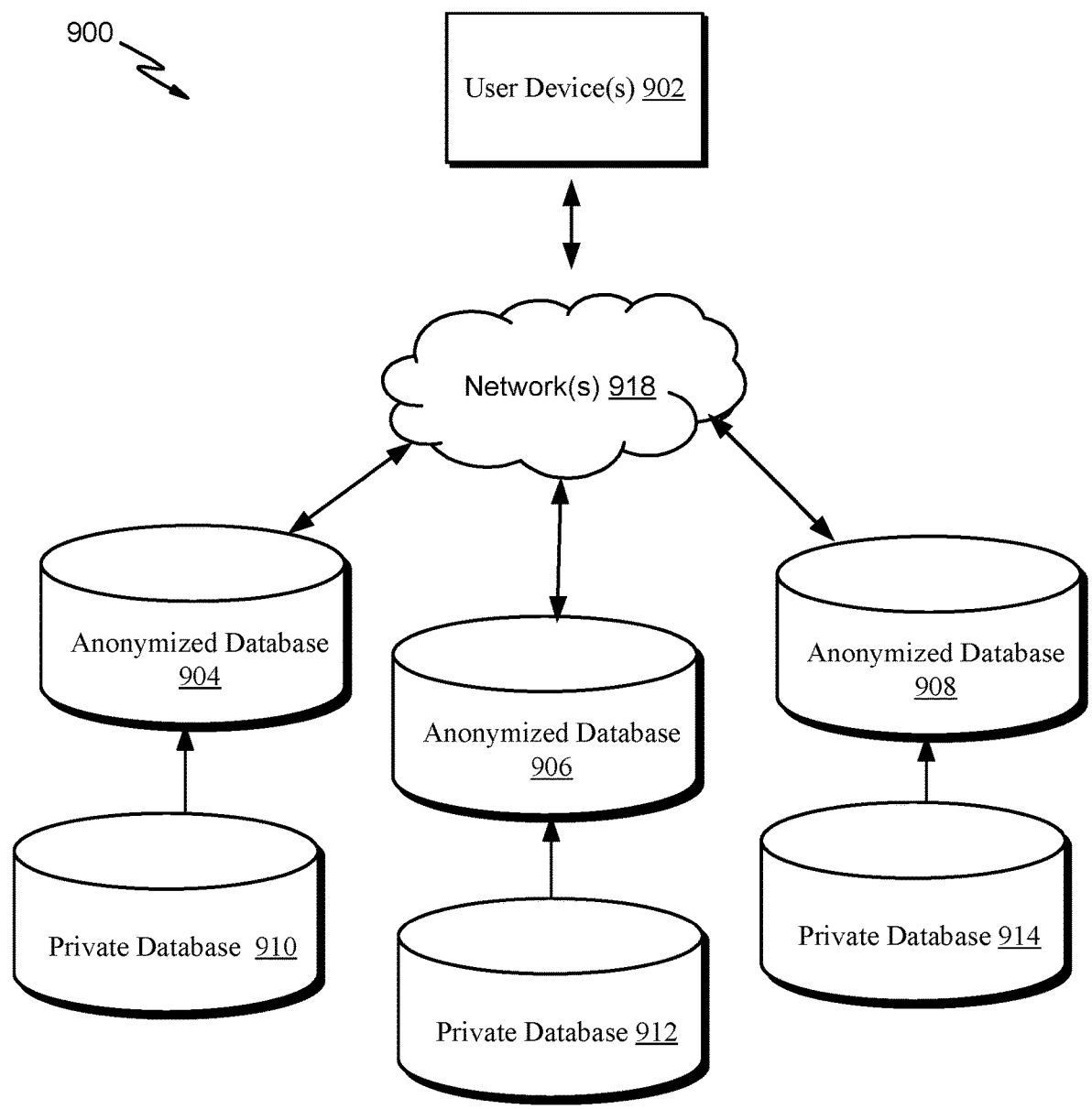
FIG. 9 is a block diagram of a computing environment, according to embodiments.

FIG. 9 is a block diagram of a computing environment 900, according to embodiments. The computing environment 900 includes one or more user devices 902 (e.g., the computing device 12 of FIG. 11) that are communicatively coupled via one or more networks 918 to each of the anonymized databases 904, 906, and 908. Each of these anonymized databases existed as a private database at some point in time—private databases 910, 912, and 914.

In some embodiments, each of the private databases 910, 912, and 914 (e.g., the table 800 of FIG. 8) correspond to different entities' private data stores. For example, regarding health data, the private database 910 in some embodiments corresponds to a database server of a first hospital, private database 912 corresponds to a database server of a second hospital, and private database 914 corresponds to a database server of a third hospital. The private databases include data in an unaltered form, such that each attribute and value is completely viewable.

Each of the private databases are anonymized to a corresponding anonymized database (e.g., via the process 500 of FIG. 5 and/or the block diagram flow illustrated in FIG. 1). For example, the private database 910 can include the table 800 of FIG. 8 and when it becomes the anonymized database 904, it is viewable according to the table 830 of FIG. 8 and performs all of the functions necessary to become the table 830.

A user, such as a researcher, utilizing the user device(s) 902 may desire to obtain data located on each of the anonymized databases. Accordingly, the user device(s) 902 issue a plurality of requests (e.g., read requests) over the network(s) 918 in order to access the data within each of the anonymized databases. The user device(s) 902 and the anonymized databases establish connections with each other via the network(s) 918. Network(s) 918 is or includes any suitable network such as a local area network (LAN), a general wide area network (WAN), a personal area network (PAN), and/or a public network (e.g., the internet). In some embodiments, the computing environment 900 is or includes the cloud computing environment 50 as described in FIG. 11.

Figure 10:
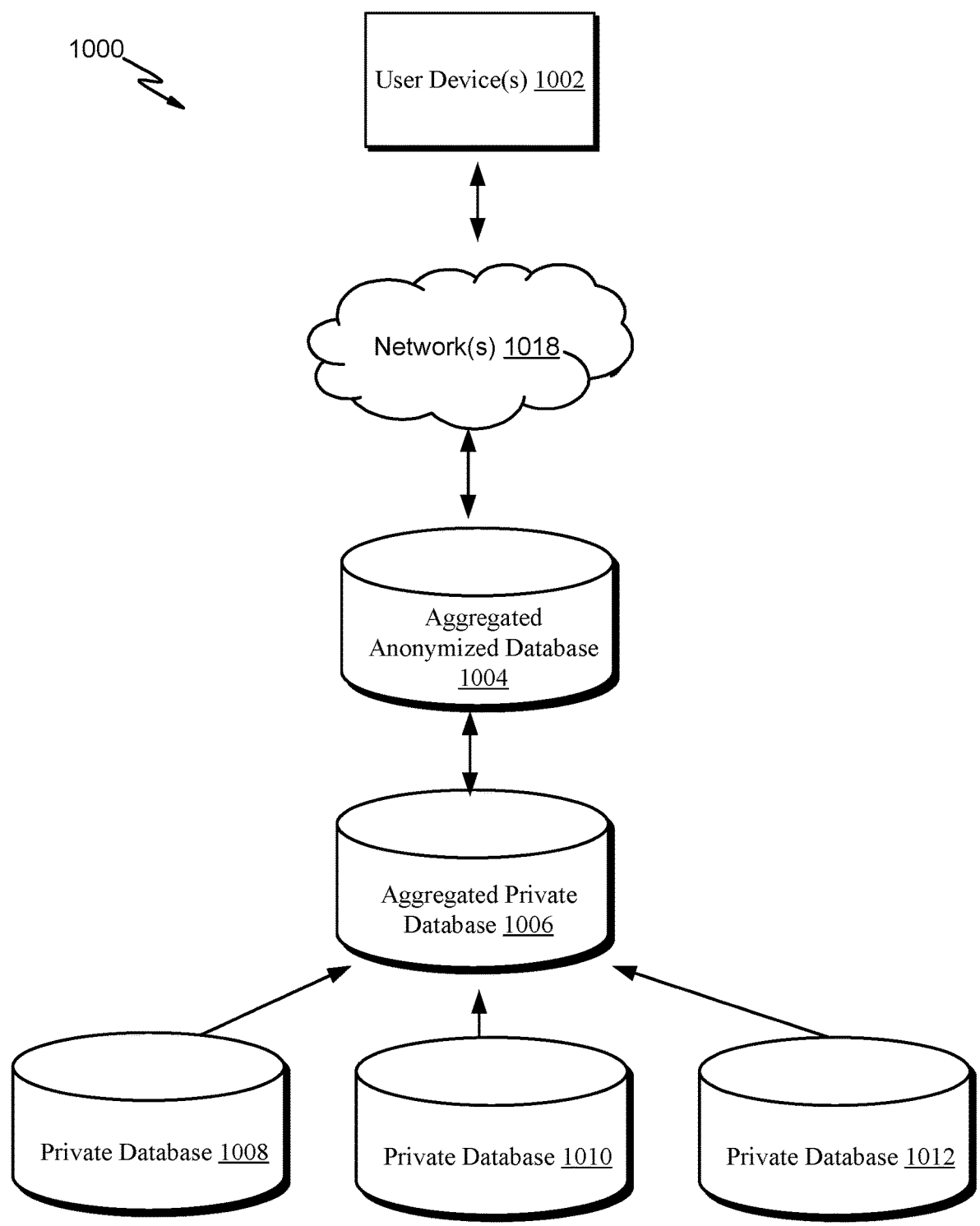
FIG. 10 is a block diagram of a computing environment, according to embodiments.

FIG. 10 is a block diagram of a computing environment 1000, according to embodiments. The computing environment 1000 includes one or more user devices 1002 (e.g., the computing device 12 of FIG. 11) that are communicatively coupled via one or more networks 1018 to the aggregated anonymized database 1004. The aggregated anonymized database 1004 is a single central data store that includes an anonymized group of databases. The aggregated anonymized database 1004 existed at one time as the aggregated private database 1006. The aggregated private database 1006 is a single central private data store that includes each of the private databases 1008, 1010, and 1012.

In some embodiments, each of the private databases 1008, 1010, and 1012 correspond to different entities' private data stores. For example, regarding health data, the private database 1008 in some embodiments corresponds to a server of a first health center, private database 1010 corresponds to a server of a second health center, and private database 1012 corresponds to a server of a third health center. The private databases include data in an unaltered form, such that each attribute and value is completely viewable.

Each of the private databases are aggregated or consolidated into one data store by an independent source, such as a trusted third party (e.g., another computing device(s) entity separate from entities associated with the private databases 1008, 1010, and 1012). The aggregated private database 1006 is then anonymized to the corresponding aggregated anonymized database 1004 (e.g., via the process 500 of FIG. 5 and/or the block diagram flow illustrated in FIG. 1). For example, the aggregated private database 1006 can include multiple tables or databases analogous to the table 800 of FIG. 8 and when they are anonymized to become the aggregated anonymized database 1004, multiple tables and/or databases are viewable analogous to the table 830 of FIG. 8 and performs all of the functions necessary to become the table 830.

A user, such as a researcher, utilizing the user device(s) 1002 may desire to obtain data located on the aggregated anonymized database 1004. Accordingly, the user device(s) 1002 issues a request over the network(s) 1018 in order to access the data within the aggregated anonymized database 1004. The user device(s) 1002 and the aggregated anonymized database 1004 establish a connection with each other via the network(s) 1018. Network(s) 1018 is or includes any suitable network such as a local area network (LAN), a general wide area network (WAN), a personal area network (PAN), and/or a public network (e.g., the internet). In some embodiments, the computing environment 1000 is or includes the cloud computing environment 50 as described in FIG. 11.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
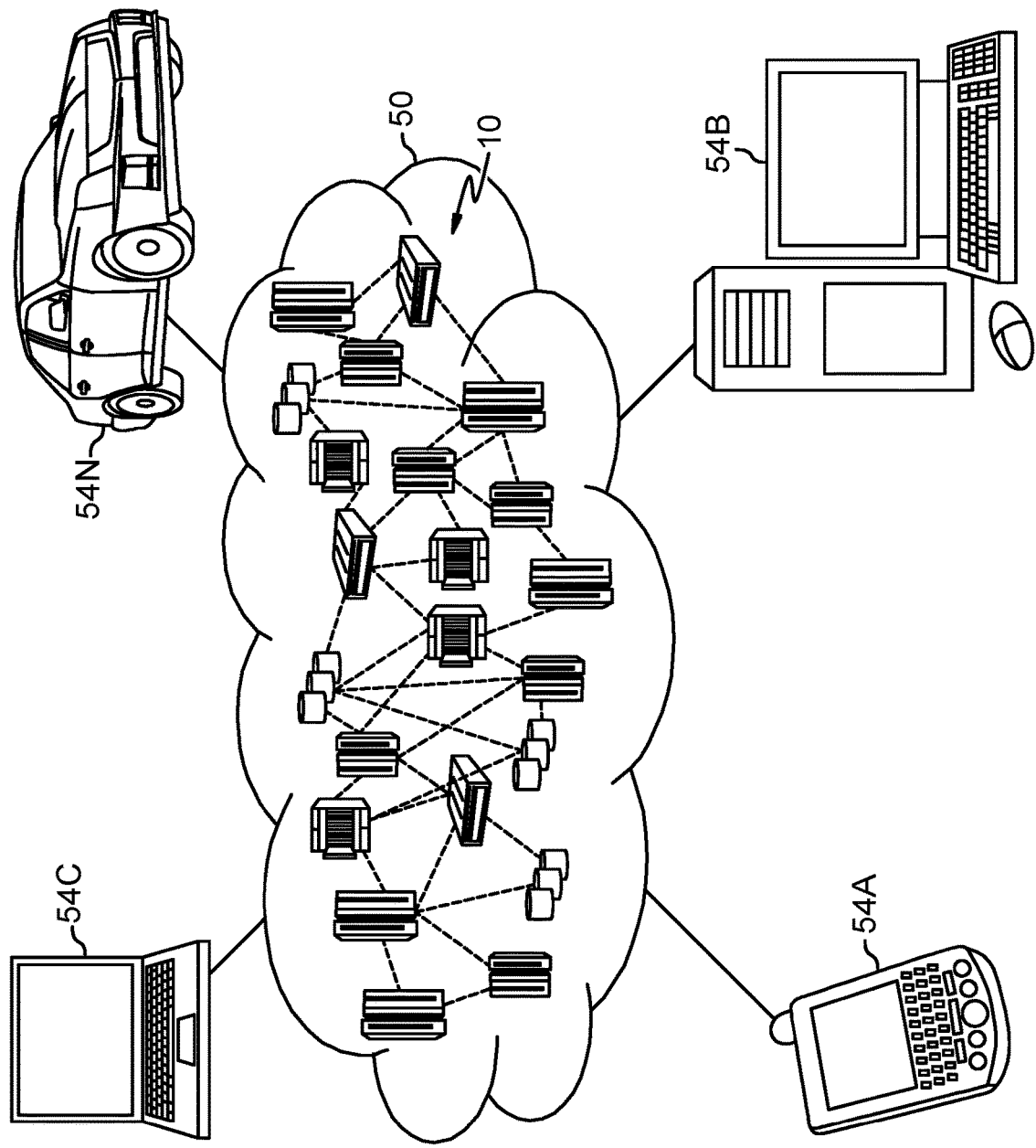
FIG. 11 depicts a cloud computing environment according to embodiments of the present disclosure.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
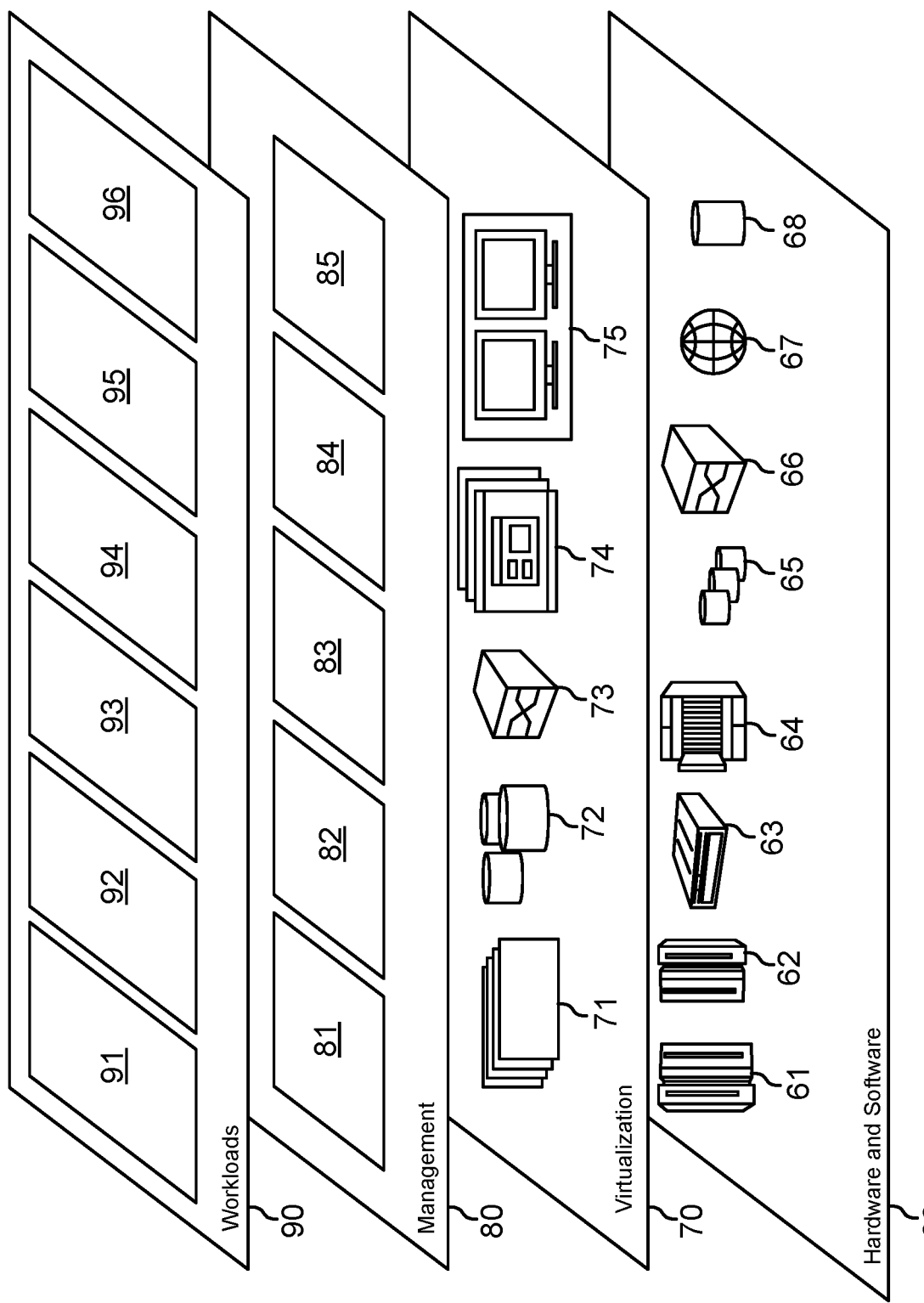
FIG. 12 depicts abstraction model layers according to embodiments of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and noise propagation-based data anonymization 96 (e.g., anonymization based on the process 500 of FIG. 5).

Figure 13:
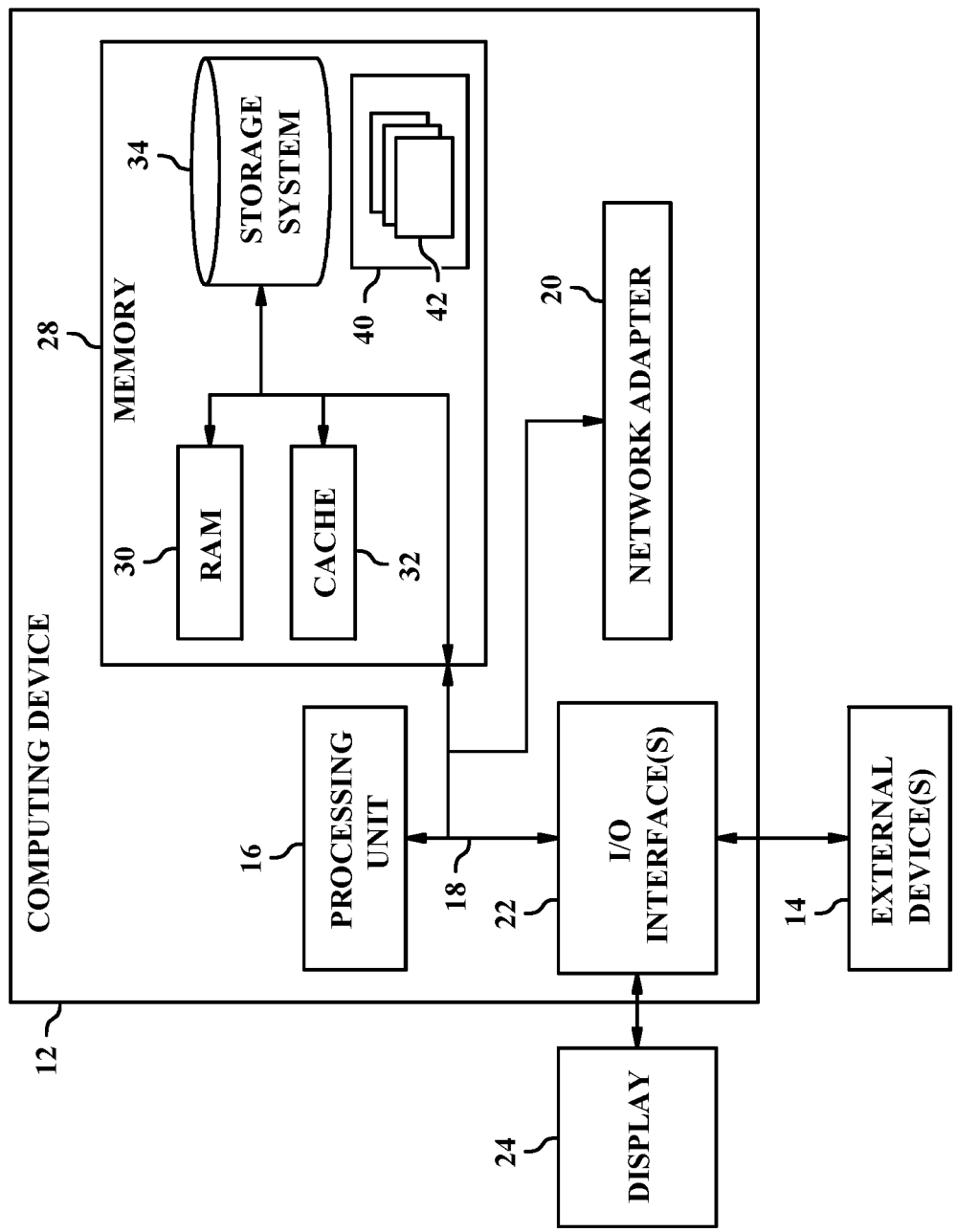
FIG. 13 is a block diagram of a computing device, according to embodiments.

FIG. 13 is a block diagram of a computing device 12, according to embodiments. As shown in FIG. 13, the computing device 12 is shown in the form of a general-purpose computing device, which is not to be construed necessarily by one of ordinary skill in the art as a generic computer that performs generic functions. Rather, the computing device 12 is illustrative only of what components a computing device may include. The components of computing device 12 may include, but are not limited to, one or more processors or processing units 16, a system memory 28, and a bus 18 that couples various system components including system memory 28 to processor 16. In some embodiments, the computing device 12 represents the user devices 902, 1002, a computing device that includes the anonymized databases (e.g., 904), the aggregated anonymized database 1004, the computing devices 54 and/or nodes 10 included in FIG. 11, and/or a device that implements the flow if FIG. 1.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 12 typically includes a variety of computer system readable media. Such media may be any available media that is accessible by computing device 12, and it includes both volatile and non-volatile media, removable and non-removable media.

System memory 28 can include computer system readable media in the form of volatile memory, such as random access memory (RAM) 30 and/or cache memory 32. Computing device 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, the program modules 42 may be or include the flow of FIG. 1, the processes described in FIG. 2, the methods described in FIG. 3, the noise propagation module 121 described in FIG. 4, the process 500, the process 600, the process 700, the functions described in FIG. 8, the computing environment functions described in FIG. 9, and/or FIG. 10

Computing device 12 may also communicate with one or more external devices 14 such as a keyboard, a pointing device, a display 24, etc.; one or more devices that enable a user to interact with computing device 12; and/or any devices (e.g., network card, modem, etc.) that enable computing device 12 to communicate with one or more other computing devices. Such communication can occur via Input/Output (I/O) interfaces 22. Still yet, computing device 12 can communicate with one or more networks such as a local area network (LAN), a general wide area network (WAN), and/or a public network (e.g., the Internet) via network adapter 20. As depicted, network adapter 20 communicates with the other components of computing device 12 via bus 18. It should be understood that although not shown, other hardware and/or software components could be used in conjunction with computing device 12. Examples, include, but are not limited to: microcode, device drivers, redundant processing units, external disk drive arrays, RAID systems, tape drives, and data archival storage systems, etc.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The following definitions are specific to this disclosure:

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "data store" as described herein is any type of repository for storing and/or managing data. For example, a data store can be or include one or more: databases, files (e.g., of unstructured data), corpuses, digital documents, etc.

The term "causing" or "cause" means that one or more systems (e.g., computing devices) and/or components (e.g., processors) may in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

The term "computing system" or "device" means a single computing device (e.g., a mobile device) and/or multiple computing devices (e.g., multiple cloud computing nodes).

The terms first (e.g., first cache), second (e.g., second cache), etc. are not to be construed as denoting or implying order or time sequences unless explicitly stated. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

What is claimed is:

1. A computer-implemented method comprising:
receiving a first set of a data associated with one or more data stores;
running one or more strings of the first set of data through at least one word embedding vector model, the running includes causing at least one representation of the one or more strings to be mapped in vector space;
determining the at least one representation's closest neighbor in the vector space;
anonymizing the first set of data based at least on the running of the one or more strings through the at least one word embedding vector model, the anonymizing includes suppressing one or more values of a first attribute and not suppressing one or more particular values of a second attribute, the anonymizing including utilizing the closest neighbor as a value to represent the one or more strings.

2. The method of claim 1, wherein the one or more data stores include one or more relational databases, and wherein the first set of data is included in a plurality of database records within the one or more relational databases, the method further comprising:
extracting, from each of the database records and at a first time, one or more real numbers, wherein the one or more strings are not extracted at the first time;
normalizing each of the one or more real numbers; and
representing the one or more real numbers as one or more tensor values.

3. The method of claim 1, wherein the vector space includes a plurality of word representations that existed before the running of the one or more strings, wherein the closest neighbor is one of the plurality of word representations, and wherein in response to a search query the closest neighbor is displayed in a view instead of the one or more strings.

4. The method of claim 1, further comprising:
suppressing an explicit identifier value of the first set of data, the explicit identifier value directly identifying an individual person; and
identifying a set of quasi-identifier values and a set of sensitive identifier values of the first set of data, the set of quasi-identifier values corresponding to a set of values that can potentially and indirectly identify a particular person, the set of sensitive identifier values corresponding to a set of values that are confidential to a person.

5. The method of claim 4, wherein the explicit identifier value, the set of quasi-identifier values, and the set of sensitive identifier values are associated with each attribute in one or more database tables, the method further comprising:
extracting the set of quasi-identifier values from a plurality of database records;
running a subset of the quasi-identifier values through the at least one word embedding vector model, wherein the explicit identifier value is not run through the at least one word embedding vector model; and
presenting the each attribute as anonymized data for a query, wherein none of the explicit identifier values are viewable, and wherein each of the sensitive identifier values are viewable.

6. The method of claim 1, wherein the at least one word embedding vector model is pre-trained at a first time, the method further comprising:
determining a distance from the at least one representation of the one or more strings to a plurality of other representations in the vector space;
selecting a representation of the plurality of representations as an output candidate for anonymization based on a policy;

determining that the selection of the representation is not consistent with the policy; and retraining, in response to the determining that the selection of the representation is not consistent with the policy, the word embedding vector model.

7. The method of claim 1, wherein the at least one word embedding vector model includes one or more word2vec two-layer neural network models, and wherein the at least one representation is one or more numerical representations that are mapped in vector space according to its semantic meaning similarity to other representations in the vector space.

8. A computer-implemented method comprising:

receiving a first set of a data associated with one or more data stores;

running one or more strings of the first set of data through at least one word embedding vector model, the running includes causing at least one representation of the one or more strings to be mapped in vector space, wherein the at least one word embedding vector model is pre-trained at a first time;

determining a distance from the at least one representation of the one or more strings to a plurality of other representations in the vector space;

selecting a representation of the plurality of representations as an output candidate for anonymization based on a policy;

determining that the selection of the representation is not consistent with the policy; and retraining, in response to the determining that the selection of the representation is not consistent with the policy, the word embedding vector model; and anonymizing the first set of data based at least on the running of the one or more strings through the at least one word embedding vector model, the anonymizing includes suppressing one or more values of a first attribute and not suppressing one or more particular values of a second attribute.

9. A computer-implemented method comprising:

receiving a first set of a data associated with one or more data stores;

extracting one or more strings from a data record;

running the one or more strings of the first set of data through at least one word embedding vector model, the running includes causing at least one representation of the one or more strings to be mapped in vector space, wherein the vector space includes a plurality of word representations that existed before the running of the one or more strings;

plotting the at least one representation within the vector space;

determining the at least one representation's closest neighbor in the vector space, the closest neighbor being one of the plurality of word representations;

anonymizing the first set of data based at least on the running of the one or more strings through the at least one word embedding vector model, the anonymizing includes suppressing one or more values of a first attribute and not suppressing one or more particular values of a second attribute; and utilizing the closest neighbor as a value to represent the one or more strings, wherein in response to a query request, the closest neighbor is displayed in a view instead of the one or more strings.

* * * * *